Figures 1, 2:
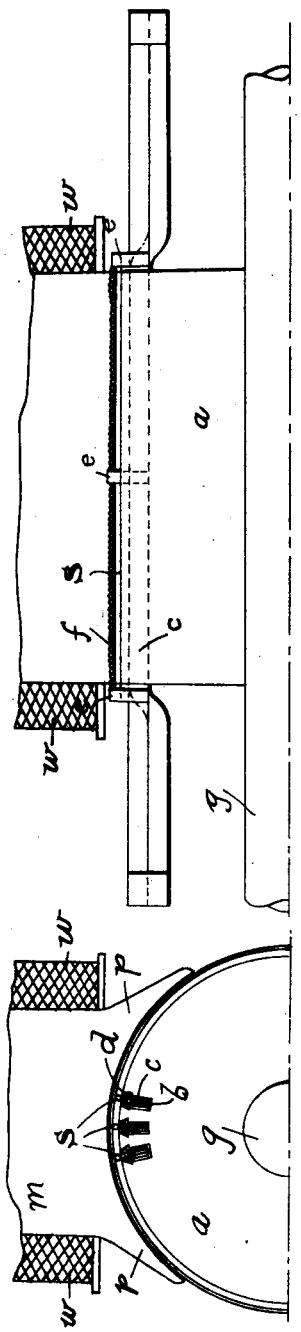

C. A. PARSONS & A. H. LAW.
DYNAMO ELECTRIC MACHINERY.
APPLICATION FILED JULY 9, 1909.

997,579.

Patented July 11, 1911.

ATTEST.

INVENTORS.
CHARLES ALGERNON PARSONS.
ALEXANDER HENRY LAW.

UNITED STATES PATENT OFFICE.

CHARLES ALGERNON PARSONS AND ALEXANDER HENRY LAW, OF NEWCASTLE-UPON-TYNE, ENGLAND; SAID LAW ASSIGNOR TO SAID PARSONS.

DYNAMO-ELECTRIC MACHINERY.

997,579.   Specification of Letters Patent.   Patented July 11, 1911.

Application filed July 9, 1909. Serial No. 506,754.

*To all whom it may concern:*

Be it known that we, CHARLES ALGERNON PARSONS and ALEXANDER HENRY LAW, subjects of the King of Great Britain and Ireland, residing at Heaton Works, Newcastle-upon-Tyne, in the county of Northumberland, England, have invented certain new and useful Improvements in and Relating to Dynamo-Electric Machinery, of which the following is a specification.

This invention relates to dynamo electric machinery and more especially to the armatures or rotating parts carrying conductors. It is also applicable to stationary parts of alternators or any electrical winding in which it is desirable to reduce the self-induction as much as possible and which winding at the same time has to be secured strongly against mechanical forces—whether purely mechanical or caused by electrical or magnetic action.

It has hitherto been proposed, as a means for preventing sparking in dynamo electric machines, to provide on the armature circuits or collector resistances for the purpose of taking up the extra currents at each interruption of the circuit, and it has also been proposed, in view of the waste of this method, to replace any desired amount of these resistances by means of an E. M. F. such as might be formed by winding the main winding with two wires in parallel, one being disposed to suit the main circuit and the other the auxiliary circuit requirements.

The object of this invention is to provide improved means whereby the self induction of embedded or partially embedded conductors may be reduced, thus reducing the tendency to spark at the brushes in direct current armatures.

Conductors which are partially embedded in iron have a different self induction in the embedded part from that in the unembedded part and this results in improved commutation, such conductors are therefore especially useful in direct current machines.

The invention consists in the use in dynamo electric machinery as referred to above, having at least partially embedded conductors of auxiliary conductors in the air gap connected in parallel with the embedded conductors so that they act in a manner similar to that of a kicking coil and reduce the tendency to spark.

Referring now to the accompanying drawings: Figures 1 and 2 indicate an armature and field of ordinary construction—only some of the armature slots being shown—with an auxiliary winding according to the present invention in addition to the main conductor for the purpose referred to later.

In carrying the invention into effect in the form illustrated, the armature core, *a*, mounted on shaft, *g*, has slots, *b*, in which are completely embedded conductors, *c*, held in by wedges, *d*. Above the wedges, *d*, are laid auxiliary conductors, *s*, and these are connected in parallel with the conductors *c*, by connecting pieces, *e*, binding wires, *f*, overlying the whole construction. The drawing also indicates a magnet *m* with pole *p* and windings *w*.

The auxiliary conductors having very little self induction owing to their being outside the armature core act in a similar manner to the kicking coil of a field magnet coil breaking switch, and allow the current in the conductor to be stopped and reversed without a large and sudden inductive rise of voltage in the coil causing sparking.

In the form shown the auxiliary conductor is joined to its main conductor by a connection at a point in the length of the armature, as well as at points external thereto, but this is not essential. Further, in the form shown the auxiliary conductor is drawn as an unlaminated conductor, but neither is this construction essential to the principle of the invention.

Having now described our invention, what we claim as new and desire to secure by Letters Patent is:—

1. In dynamo electric machinery as referred to herein, an armature core, magnetic field producing means separated by a gap from, but disposed in proximity to said core, conductors at least partially embedded in said core and auxiliary conductors electrically connected in parallel with said former conductors and situate in said gap; as and for the purposes described.

2. In dynamo electric machinery as referred to herein an armature core, poles coacting with said core and separated therefrom by an air gap, conductors at least partially embedded in said core and auxiliary conductors electrically connected in parallel with said former conductors and situate in the air gap; as and for the purposes described.

3. In dynamo electric machinery as referred to herein, a slotted armature core, poles coacting with said core and separated by a gap therefrom, conductors in said slots, means for retaining the conductors in position, and auxiliary conductors electrically connected in parallel with said former conductors, situate in the gap and in the magnetic field created by the aforesaid poles; as and for the purposes described.

4. In dynamo electric machinery as referred to herein, an armature core, poles coacting with said core and separated therefrom by an air gap, electricity conductors at least partially embedded in said core and an auxiliary conductor electrically connected in parallel with each of said former conductors around the periphery and situate in the air gap; as and for the purposes described.

5. In dynamo electric machinery as referred to herein, an armature core, poles coacting with said core and separated therefrom by an air gap, conducting means at least partially embedded in said core, said means including conductors spacially distant, and auxiliary conductors electrically connected in parallel with each of the spacially separated main conductors; as and for the purposes described.

In testimony whereof, we affix our signatures in presence of two witnesses.

CHARLES ALGERNON PARSONS.
ALEXANDER HENRY LAW.

Witnesses:
FREDERICK GORDON HAY BEDFORD,
ALBERT WILLIAM PARR.

---

Copies of this patent may be obtained for five cents each, by addressing the "Commissioner of Patents, Washington, D. C."